(12) United States Patent
Schrader et al.

(10) Patent No.: US 7,436,428 B2
(45) Date of Patent: Oct. 14, 2008

(54) SYSTEM AND METHOD FOR INCLUDING PARTICIPANTS IN A CONFERENCE CALL

(75) Inventors: Thies Schrader, Haslum (NO); Vegard Hammer, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 527 days.

(21) Appl. No.: 11/111,496

(22) Filed: Apr. 21, 2005

(65) Prior Publication Data
US 2005/0259145 A1 Nov. 24, 2005

(30) Foreign Application Priority Data
Apr. 23, 2004 (NO) .................................. 20041652

(51) Int. Cl.
*H04N 7/15* (2006.01)
(52) U.S. Cl. .................. 348/14.08; 348/14.09
(58) Field of Classification Search .............. 348/14.08, 348/14.09; 370/261, 260
See application file for complete search history.

(56) References Cited

U.S. PATENT DOCUMENTS

| 5,642,156 A | 6/1997 | Saiki |
| 2002/0118809 A1* | 8/2002 | Eisenberg ............... 379/202.01 |
| 2003/0108002 A1* | 6/2003 | Chaney et al. ............... 370/261 |
| 2003/0171938 A1 | 9/2003 | Lee et al. |
| 2004/0246332 A1* | 12/2004 | Crouch .................... 348/14.08 |

FOREIGN PATENT DOCUMENTS

| GB | 2 313 250 A | 11/1997 |
| WO | WO 2004/114662 A1 | 12/2004 |

* cited by examiner

*Primary Examiner*—Stella L Woo
(74) *Attorney, Agent, or Firm*—Oblon, Spivak, McClelland, Maier & Neustadt, P.C.

(57) ABSTRACT

The present invention discloses a method for an intuitive and easy-to-use multi-site ad hoc conference initiation by involving some or all features of a conference managing system. The main concept is to automatically reserve the resources needed to connect selected participants in a conference once the ad hoc conference is requested by the calling party.

16 Claims, 1 Drawing Sheet

SYSTEM AND METHOD FOR INCLUDING PARTICIPANTS IN A CONFERENCE CALL

RELATED APPLICATION

This application claims priority under 35 U.S.C. § 119 or 365 to Norwegian Application No. 20041652, filed Apr. 23, 2004. The entire teachings of the above application are incorporated herein by reference.

FIELD OF THE INVENTION

The present invention relates to initiating audio/video conferences.

BACKGROUND OF THE INVENTION

Conventional audio/video conferencing systems comprise a number of end-points communicating real-time video, audio and/or data streams over and between various networks such as WAN, LAN and circuit switched networks.

A number of audio/video conference systems residing at different sites may participate in the same conference, most often through one or more MCU's (Multipoint Control Unit) performing i.e. switching functions in order to allow the audiovisual terminals to intercommunicate properly.

Audio/video conferencing involves various resources and equipment interoperating simultaneously at different localizations and capabilities. Thus, there is a need for the possibility to manage the resources involved. Audio/video conferencing systems are therefore often used in conjunction with a management system.

A management system is usually a common portal for carrying out key operations and monitoring a conferencing network. The management system may include booking, monitoring, maintaining, managing and troubleshooting the conferencing systems from a single location, ensuring a smooth operation of all systems. Such systems are often web-based, and can therefore be accessed from any workstation running a web-browser. The ability to control, monitor, schedule calls and maintain the videoconferencing systems including MCUs, end-points and gateways, from one point also decreases the time used for tasks such as software upgrading, call control, managing directories and monitoring.

Traditionally, videoconferences scheduled using a Managing System are planned ahead of time with a list of invited participants, a start time, and an end time. A resource scheduler in the management system is a module that is used for the scheduling or booking of resources at any given point of time. The resource scheduler allows a user to request resource usage, and either allow or disallow the usage at the requested time dependent on the resources available for the inquired time period. The resource scheduler is used for scheduling the use of meeting rooms, network resources, video systems etc. The resource scheduler must be connected to a database containing information regarding the resources of the respective devices, like MCU's, gateways, routers, end-points etc., in addition to retrieving updated booking information.

As an example, if user A schedules a conference call with end-point B and C through an MCU, the resource scheduler makes an inquiry in the database to investigate the capabilities of end-point B, C and the MCU, and whether they are available for the given time period. If resources are already booked for the MCU, the remaining available resources will determine if a conference call may take place. If sufficient resources remain, the conference call will be booked, and the database will be updated about the booking. Succeeding attempts for scheduling the End-Points in the same period will not be possible because they will be marked as "busy" in the database. The same will be the case for the MCU, if e.g. four of four possible simultaneous conferences through the MCU already are reserved.

A managing system for videoconferencing also include a connection manager automatically connecting the invited participants at the start time given for the conference, and disconnecting all the participants at the conference end time.

In addition, the management system may include a routing manager providing automatic routing between the participating end-points. The routing manager collects registration and booking data about the end-points and available network devices from the managing system database. A set of possible routes between the end-points including necessary network devices is generated, using said booking and registration data. The routing manager then picks the best route based on predefined rules.

Traditionally, within the state of the art, video conferences scheduled using a conference management system are planned ahead of time with a list of invited participants, a start time, and an end time. As already mentioned, the conference management system will be responsible for checking available video conferencing resources for the requested time, connect the invited participants at the start time given for the conference, and disconnect all the participants at the conference end time. However, by attempting to manage ad hoc audio/video conferences in the same environment, certain new issues need to be addressed. When inviting several participants to an ad hoc videoconference, there is a risk that some of the invited participants are not able to attend, and thereby occupying videoconferencing resources that could have been used by others. The risk of participants not being able to attend an ad hoc videoconference is higher than the risk of participants not being able to attend a planned videoconference. Adding a participant to an ongoing conference is also a problem, as adding this participant may result in disconnection of the ongoing conference due to possible requirements of other network resources.

As more and more users use video as an ad hoc communication tool, there is an increasing need for Videoconference managing systems to manage such conference types. When involving multiple parties in ad hoc videoconferences there is extended need to manage the resources in a strict manner so that no resources will be booked, without being in actual use.

SUMMARY OF THE INVENTION

The present invention provides a method and a system avoiding the above-described problems.

The features defined in the independent claims enclosed characterize this method.

In particular, the present invention provides a method and system for initiating an ad hoc conference between an inviting participant and one or more invited participants, the inviting participant being connected to a conference managing system having a capability and booking database, and the respective participants having at least one conferencing end-point associated therewith, including triggering transmission of a request identifying the one or more invited participants and/or associated end-points to the conference managing system at initiation of the ad hoc conference, at receipt of the request in the managing system, investigating in the capability and booking database at least whether the one or more participants' associated conferencing end-points currently are idle, and if so, automatically connecting the inviting participant's end-point and the one or more invited participants' end-points in the ad hoc conference. The invention also includes a system implementing this method.

BRIEF DESCRIPTION OF THE DRAWINGS

In order to make the invention more readily understandable, the discussion that follows will refer to the accompanying drawing.

DETAILED DESCRIPTION OF THE INVENTION

Figure 1:
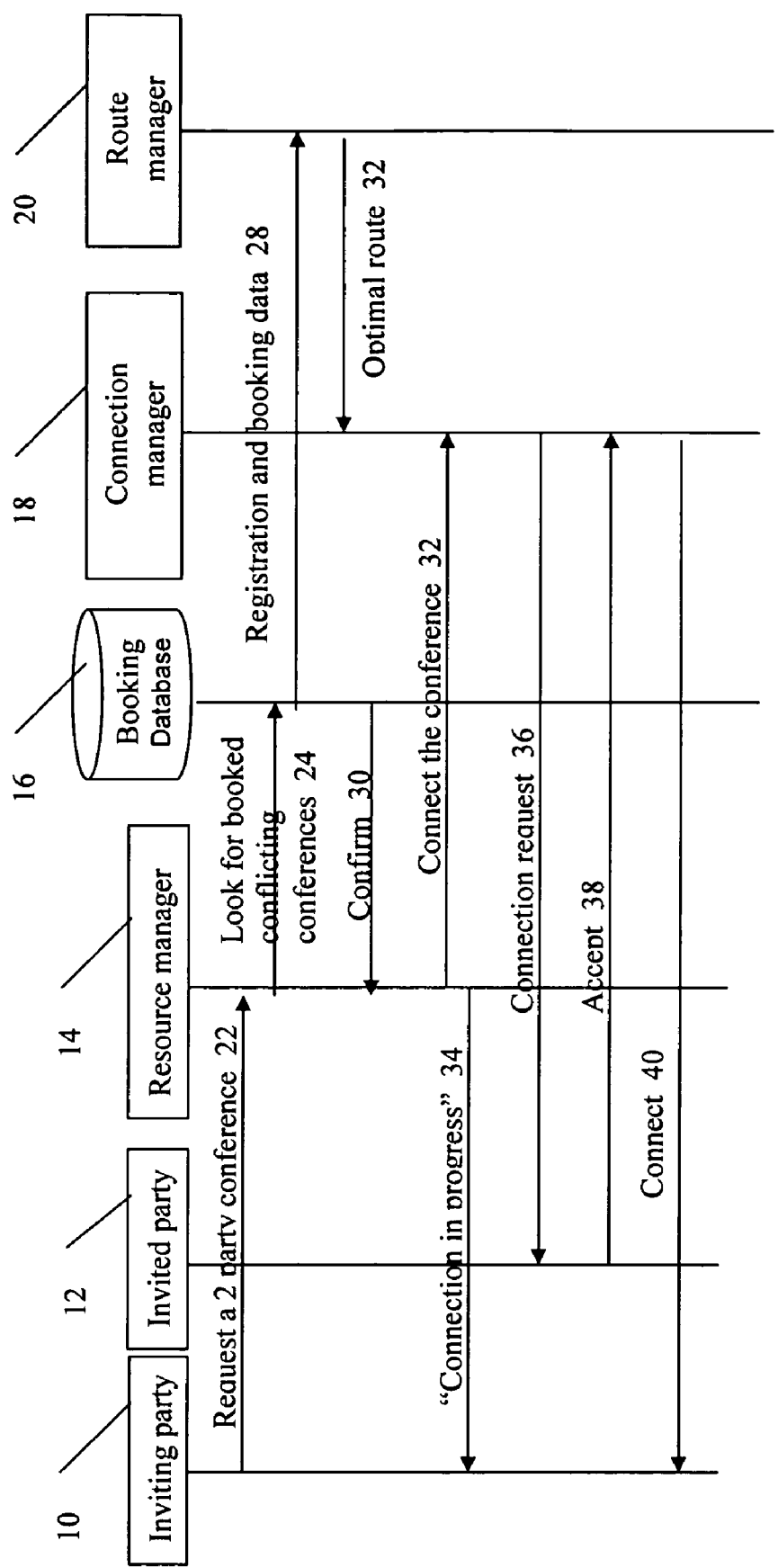
FIG. 1 shows the message flows between the involved entities in an example embodiment of the present invention.

A description of preferred embodiments of the invention follows.

In the following, the present invention will be discussed by describing a preferred embodiment, and by referring to the accompanying drawings. However, people skilled in the art will realize other applications and modifications within the scope of the invention as defined in the enclosed independent claims.

To achieve a more widespread use of video conferencing systems, ad hoc conferences should be as easy and intuitive as making a traditional phone call or when contacting other people through e.g. Instant Messaging and Presence services. Whenever a person wants to use video conferencing facilities, as long as there are resources available, independent of scheduled conferences, he/she must instantly be given audio/video conference resources with minimum of preparations and efforts.

The present invention provides this intuitive and easy-to-use multi-site ad hoc conference initiation by involving some or all features of a conference managing system. The main concept is to automatically reserve the resources needed to connect selected participants in a conference once the ad hoc conference is requested by the calling party and accepted by the invited participants. In one embodiment of the invention, the participants will be invited, and connected to the conference once they accept the invitation. If there are not enough resources to connect the number of requested participants, the user will receive a message informing about the situation, and suggest a number of participants to invite. If the user wants to invite more participants to an existing videoconference, a resource manager will calculate the available resources, and let the user know if adding the participant is possible.

According to the present invention, the conference managing system will be requested, as a user calls up one or more participants for an immediate call. The user may utilize an Instant Messaging (IM) application associated with his/her end-point for initiating a call by clicking on the selected participants in a buddy-list incorporated in the IM interface. Alternatively, the user may initiate the call directly from his/her end-point through a menu system or by simply consecutively dialling the participants system numbers. At initiation, one or more of the modules in a managing system is requested, preferably without the user being aware of it, or having to take a stand to anything in the modules. The managing system then automatically selects and book resources and makes routing decisions merely based on the knowledge of which end-points are to participate, and information available in the database of the managing system.

The message flow in one embodiment of the present invention is shown in FIG. 1. When an inviting party 10 invites one invited party 12 to a multipart ad hoc conference, a request 22 is first sent to a resource manager 14. The request for a conference may include an identification of participants invited, and these participants' calling capabilities.

The resource manager 14 will then start to calculate available resources at a given time. The resources needed to conduct a videoconference are dependent on the following parameters:
Number of participants
Bandwidth requested for each participant
Calling protocol
Video resolution
Current resource usage
Knowledge of endpoint capabilities This information will be provided by transmitting an inquiry 24 to the managing system database 16. If required resources for adding the invited party 12 to the conference are available (invited party not already booked, MCU resources available etc.), the resources will be assigned as booked in the database, and a confirm message 30 preferably including the network resources to be used, is returned to the resource manager 14, and the resource manager will inform the inviting party 10 that the invitation should be sent. On the other hand, if sufficient resources are not available, this would be communicated to the resource manager 14, and the resource manager will return a deny call set up message to the inviting party 10, or alternatively a message suggesting how to alter the request so that it will be accepted. (E.g. lowering the bandwidth or reducing the number of participants).

As earlier mentioned, a conference managing system may also include a route manager 20. Such a route manager could also be involved in automatically setting up an ad hoc conference to further optimize the process. The route manager would receive registration and booking data 28 from the booking database 16 and then calculate an optimal route 32 of currently available network resources based on predefined cost functions. This route will then be used by the connection manager 18 when connecting the conference.

However, assuming now that the required resources are available, at reception of the confirm message 30, the resource manager returns 14 a message 34 informing the inviting party 10 that connection of the requested call is in progress. Another message 32 including sufficient information to connect the conference (end-point addresses, network resource addresses et.c.) is transmitted to a connection manager 18. At reception of the message 32, the connection manager 18 will send a connect request 36 according to the signalling protocol being used, to both the inviting and invited parties 10, 12 respectively. When the invited party 10 accepts via message 38, the conference is connected 40.

When one or more of the parties disconnects, a similar inverted procedure will be carried out. As a disconnect message from one of the parties reaches the connection manager 18, it disconnects the party according to the signalling protocol being used, and transmits a message to the resource manager 14 informing about the disconnection. The resource manager interprets the message, and conveys the information to the database 16, which in turn assigns the state of the disconnected party from booked to idle. Other resources that may have become redundant due to the disconnection are also released.

When the participants receive an invitation, i.e. a connection request 36, they can either accept or decline. If a participant declines, the inviting party 10 will be informed, and the resources that the invited participant should have occupied will be released in the database.

The inviting party 10 of a videoconference may want to add more participants to a conference after the conference has started. Again the resource manager 14 will calculate if there are enough resources for adding participants, and carries out the same procedure as described above. In some cases adding participants to the conference may result in the need to reroute the call through other network units. This may require a temporary stop to the ongoing conference. The inviting party 10 will be asked if this is a desired solution. If the inviting party 10 accepts this solution, the ongoing conference will be ended, and a new conference with the new invited participant will be started. If the inviting party 10 declines this solution, nothing will happen. Alternatively to stopping the conference, an alternative connection through a second network unit may be provided, to which the conference is forwarded. After forwarding, the resources previously occupied in the network unit(s), from which the conference is forwarded, will then be released. Switching to other network units when adding new participants will then be carried out without the need of ending the conference.

Also, by the introduction of presence and IM, initiating a call with another user, or including a user in an already established conference, will be easy and intuitive, as the inviting user simply can double click the link of the wanted and present invited user included in the "buddy list" of the presence or IM application. Even if an IM application is not installed at the inviting party, presence application features could still be utilized. If the invited parties have IM or presence application installed, and the associated presence database is connected to the conference managing system, the presence information of the invited parties can be used to make a decision whether the ad hoc conference may take place or not. The resource manager will then also have to invoke the presence database to investigate whether the invited parties currently are present at their associated end-points.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for initiating an ad hoc conference between an inviting participant and one or more invited participants or adding the one or more invited participants to the ad hoc conference if already initiated, the inviting participant being connected to a conference managing system having a capability and booking database, and the respective participants having at least one conferencing end-point associated therewith, the method comprising:
   triggering transmission of a request identifying the one or more invited participants or associated end-points to the conference managing system at initiation of the ad hoc conference or when adding the one or more invited participants to the ad hoc conference, and
   at receipt of the request in the managing system, investigating in the capability and booking database at least whether the one or more invited participants' associated conferencing end-points currently are idle, and if so automatically connecting the inviting participant's end-point and the one or more invited participants' end-points in the ad hoc conference.

2. A method according to claim 1, wherein the investigating further includes investigating whether the one or more invited participants' end-points have sufficient communication capabilities to participate in the ad hoc conference.

3. A method according to claim 1, further comprising:
   if the one or more invited participants' associated conferencing end-points currently are idle, changing status of the inviting party's end-point and the invited parties' end-points in the capability and booking database from idle to busy, and
   updating status of network resources occupied by the ad hoc conference.

4. A method according to claim 1, further comprising:
   if the one or more invited participants' associated conferencing end-points currently are idle, automatically creating a route of network resources for the ad hoc conference dependent on data in the capability and booking database or by minimizing predefined cost functions.

5. A method according to claim 4, wherein the network resources are one or more Gateways or one or more MCU's.

6. A method according to claim 1, wherein the investigating further includes investigating a presence database associated with an IM application installed at the one or more invited participants whether the one or more invited participants are present at their respective end-points.

7. A method according to claim 1, further comprising initiating the ad hoc conference by selecting the one or more invited participants through an IM application user interface.

8. A method according to claim 1, wherein the inviting party initiates the ad hoc conference by dialing one or more phone numbers of the one or more invited participants' end-points.

9. A system for initiating an ad hoc conference between an inviting participant and one or more invited participants, or adding the one or more invited participants to the ad hoc conference if already initiated, the inviting participant being connected to a conference managing system having a capability and booking database, and the respective participants having at least one conferencing end-point associated therewith, the system comprising:
   a transmitting unit configured to transmit a request identifying the one or more invited participants or associated end-points to the conference managing system at initiation of the ad hoc conference or when adding the one or more invited participants to the ad hoc conference,
   a resource manager in the conference managing system, which at receipt of the request is configured to investigate in the capability and booking database at least whether the one or more invited participants' associated end-points currently are idle, and
   a connection manager in the conference managing system, which is configured to automatically connect the inviting participant's end-point and the one or more invited participants' end-points in the ad hoc conference if said resource manager states that the one or more invited participants' associated end-points currently are idle.

10. A system according to claim 9, wherein the resource manager is further configured to investigate whether the one or more invited participants' endpoints have sufficient communication capabilities to participate in the ad hoc conference, and wherein the connection manager is configured to not connect if sufficient communication capabilities do not exist.

11. A system according to claim 9, wherein the resource manager is further configured to change status of the inviting party's end-point and the invited parties' end-points in the capability and booking database from idle to busy, and update status of network resources occupied by the ad hoc conference.

12. A system according to claim 9, further comprising:
   a routing manager configured to automatically create a route of network resources for the ad hoc conference dependent on data in the capability and booking database or by minimizing predefined cost functions.

13. A system according to claim 12, wherein the network resources are one or more Gateways or one or more MCU's.

14. A system according to claim 9, wherein the resource manager is further configured to investigate a presence database associated with an IM application installed at the one or more invited participants to determine whether the one or more invited participants are present at their respective end-points.

15. A system according to claim 9, wherein the system is configured to be adjusted to allow the inviting party to initiate the ad hoc conference by selecting the one or more invited participants through an IM application user interface.

16. A system according to claim 9, wherein the system is adjusted to allow the inviting party to initiate the ad hoc conference by dialing one or more phone numbers of the one or more invited participants' end-points.

* * * * *